(12) United States Patent
Arita et al.

(10) Patent No.: US 10,023,475 B2
(45) Date of Patent: Jul. 17, 2018

(54) WATER PROCESSING FILTER AND MANUFACTURING METHOD THEREFOR

(71) Applicant: Kuraray Co., Ltd., Kurashiki-shi (JP)

(72) Inventors: Satoru Arita, Bizen (JP); Shizuo Ishimura, Bizen (JP); Tetsuya Hanamoto, Bizen (JP)

(73) Assignee: KURARAY CO., LTD., Kurashiki-shi (JP)

( * ) Notice: Subject to any disclaimer, the term of this patent is extended or adjusted under 35 U.S.C. 154(b) by 492 days.

(21) Appl. No.: 14/435,924

(22) PCT Filed: Oct. 17, 2013

(86) PCT No.: PCT/JP2013/078192
§ 371 (c)(1),
(2) Date: Apr. 15, 2015

(87) PCT Pub. No.: WO2014/061740
PCT Pub. Date: Apr. 24, 2014

(65) Prior Publication Data
US 2015/0266751 A1  Sep. 24, 2015

(30) Foreign Application Priority Data
Oct. 19, 2012 (JP) ................................. 2012-231620

(51) Int. Cl.
*C02F 1/28* (2006.01)
*B01D 39/20* (2006.01)
(Continued)

(52) U.S. Cl.
CPC ............ *C02F 1/283* (2013.01); *B01D 24/001* (2013.01); *B01D 24/205* (2013.01);
(Continued)

(58) Field of Classification Search
CPC ............. B01J 20/3021; B01J 20/28011; B01D 39/2062
See application file for complete search history.

(56) References Cited

U.S. PATENT DOCUMENTS 6,770,736 B1  8/2004 Haftka et al.
7,229,552 B1  6/2007 Levy
(Continued)

FOREIGN PATENT DOCUMENTS

| CN | 1319108 A | 10/2001 |
| JP | 2000 24649 | 1/2000 |

(Continued)

OTHER PUBLICATIONS

JP 2005169332 A Machine Translation.pdf—Taniguchi et al—Jun. 30, 2005.*

(Continued)

*Primary Examiner* — Krishnan S Menon
*Assistant Examiner* — Bradley R Spies
(74) *Attorney, Agent, or Firm* — Oblon, McClelland, Maier & Neustadt, L.L.P.

(57) ABSTRACT

A water-processing filter having a high dimensional accuracy and an improved filterability (such as a capability to remove turbidity components) is provided. The water-processing filter comprises (A) a hollow cylindrical filter which comprises (a1) a granular activated carbon having a median particle size of 30 to 80 μm and (a2) a fibrillated fibrous binder. The cylindrical filter (A) has an upstream outer surface having an arithmetical mean deviation of a waviness profile adjusted to not more than 30 μm and an arithmetical mean deviation of a primary profile adjusted to 35 to 45 μm. The cylindrical filter (A) may have a downstream inner surface having an arithmetical mean deviation of a waviness profile of not more than 30 μm and an arithmetical mean
(Continued)

deviation of a primary profile of 35 to 45 μm. The cylindrical filter (A) may have a grounded outer surface. In a hollow space of the cylindrical filter (A), (B) a cylindrical filter comprising (b1) a granular activated carbon having a median particle size of 30 to 80 μm and (b2) a granular binder may be disposed.

10 Claims, 2 Drawing Sheets

(51) Int. Cl.
    *B01J 20/20*     (2006.01)
    *B01J 20/28*     (2006.01)
    *B01J 20/30*     (2006.01)
    *B01D 24/00*     (2006.01)
    *B01D 24/20*     (2006.01)
    *C02F 101/12*     (2006.01)
    *C02F 101/36*     (2006.01)

(52) U.S. Cl.
    CPC .......... *B01D 39/2062* (2013.01); *B01J 20/20* (2013.01); *B01J 20/2803* (2013.01); *B01J 20/28011* (2013.01); *B01J 20/28019* (2013.01); *B01J 20/28042* (2013.01); *B01J 20/28057* (2013.01); *B01J 20/3007* (2013.01); *B01J 20/3021* (2013.01); *B01J 20/3085* (2013.01); *C02F 2101/12* (2013.01); *C02F 2101/36* (2013.01)

(56) References Cited

U.S. PATENT DOCUMENTS

| | | | |
|---|---|---|---|
| 2002/0050154 A1* | 5/2002 | Kase | ........................ B24B 5/045 65/377 |
| 2006/0207925 A1 | 9/2006 | Levy | |
| 2006/0261000 A1* | 11/2006 | Bassett | .................. B01D 35/30 210/435 |
| 2007/0099796 A1* | 5/2007 | Nakamura | ........... B01D 53/945 502/304 |
| 2008/0299483 A1* | 12/2008 | Mizumoto | ........... G03G 15/752 430/130 |
| 2010/0219131 A1 | 9/2010 | Levy | |
| 2011/0017660 A1* | 1/2011 | Kochi | .................. B01D 61/145 210/500.23 |
| 2012/0132578 A1 | 5/2012 | Yoshinobu et al. | |
| 2013/0092631 A1 | 4/2013 | Levy | |

FOREIGN PATENT DOCUMENTS

| | | | |
|---|---|---|---|
| JP | 2005169332 A | * | 6/2005 |
| JP | 2008 62234 | | 3/2008 |
| JP | 4064309 | | 3/2008 |
| JP | 2010 269225 | | 12/2010 |
| JP | 2011 255310 | | 12/2011 |
| WO | 2011 016548 | | 2/2011 |

OTHER PUBLICATIONS

JP 2011255310 A Machine Translation.pdf—Sakai et al—Dec. 22, 2011.*
International Search Report dated Dec. 17, 2013 in PCT/JP13/078192 Filed Oct. 17, 2013.
Combined Taiwanese Office Action and Search Report dated Oct. 19, 2016 in Patent Application No. 102137648 (with English translation).
JIS B 0601: 2013 (ISO 4287: 1997) in English.
JIS B 0601: Jan. 20, 2001 (ISO 4287: 1997) Cover page only (in Japanese).

* cited by examiner

[Fig. 1]
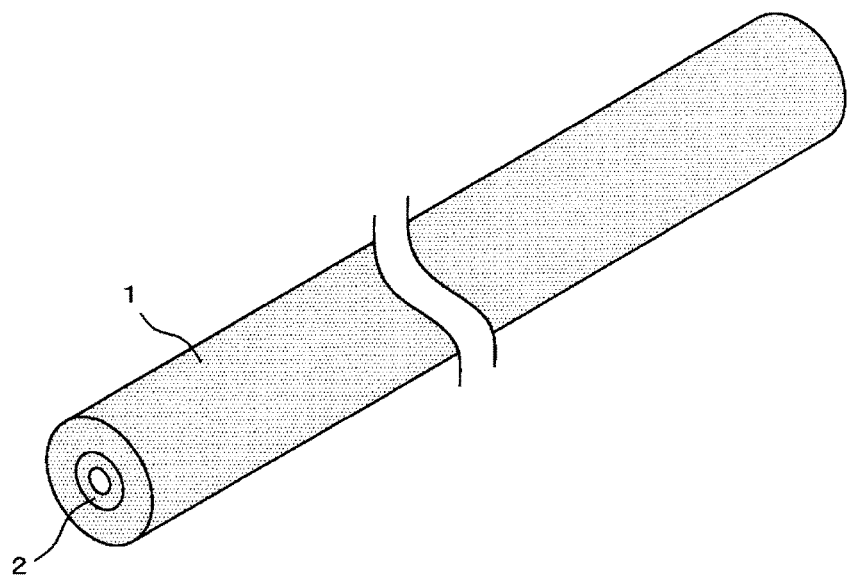

[Fig. 2]
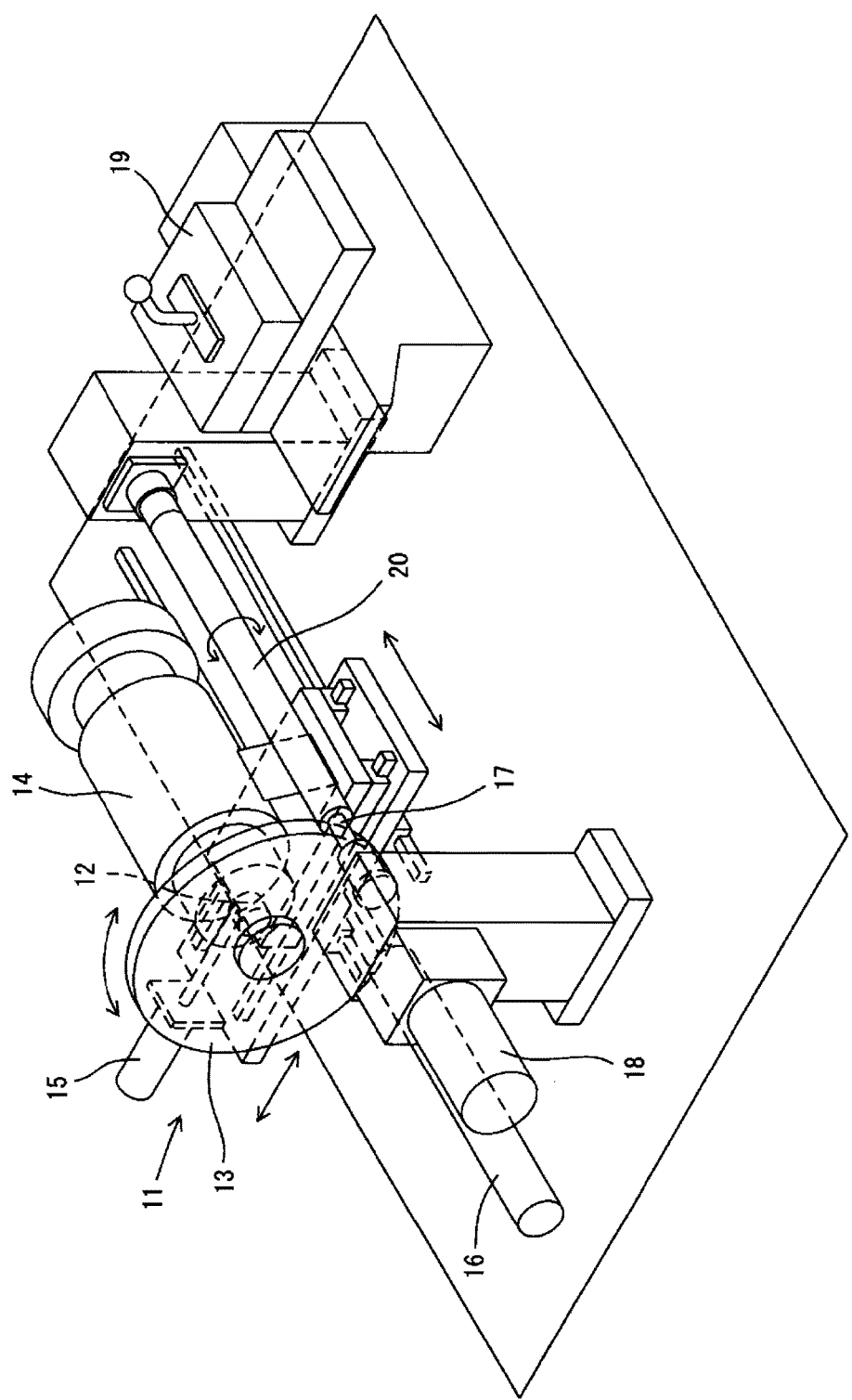

WATER PROCESSING FILTER AND MANUFACTURING METHOD THEREFOR

TECHNICAL FIELD

The present invention relates to water-processing filters that removes harmful substances contained in clean water (such as drinking water or tap water) and methods for producing the filters.

BACKGROUND ART

Safety and health concerns are now arising about the quality of drinking water, in particular, tap water, and removal of harmful substances (e.g., free residual chlorine, trihalomethanes, and mold odors) contained in drinking water is being desired. Heretofore, for the removal of these harmful substances, water purifiers having a housing filled with a granular activated carbon have been mainly used. In particular, trihalomethanes dissolved in tap water in minor quantities are suspected to be a carcinogen. With a recent increase in health consciousness, a water purifier by which trihalomethanes can be removed takes on a growing importance.

The present applicant reported a water purifier provided with, as a cartridge, a molded activated carbon for removal of trihalomethanes in Japanese Patent No. 4064309 (JP-4064309B, Patent Document 1; the molded activated carbon is produced by mixing 100 parts by weight of a fibrous activated carbon having a specific surface area of 1000 to 1800 $m^2/g$, 10 to 300 parts by weight of a powdery coconut-shell or phenol resin-series activated carbon having a median particle size of 10 to 70 μm and a capacity to adsorb benzene of 25 to 40% by weight, and 3 to 30 parts by weight of a fibrous binder to give a mixture, dispersing the mixture in water to give a slurry, and integrally molding the slurry by a slurry suction method.

In a case where the cartridge formed from the molded product is set in a container, such as a housing (a casing), it is necessary to further compress the cartridge on a workbench in order to improve the shape of the cartridge. Unfortunately, the compression treatment (rolling treatment) results in the cartridge decreasing in a capability to filter out turbidity components (impurities) probably due to the compression of the surface of the cartridge.

Moreover, the present applicant reported, in WO2011/016548 (Patent Document 2), a molded activated carbon as a filter being capable of increasing the removal of turbidity components in addition to harmful substances (such as trihalomethanes); the molded activated carbon is formed from a mixture containing a powdery activated carbon having a median particle size of 80 to 120 μm and a specified standard deviation in a particle size distribution and a fibrous binder. The molded product is highly capable of removing free residual chlorine, volatile organic compounds, CAT (2-chloro-4,6-bisethylamino-1,3,5-triazine), and 2-MIB (2-methylisoborneol) as measured according to Japanese Industrial Standards (JIS) S3201(2004) and has an improved filterability of turbidity components compared with a conventional activated carbon. Further, this document discloses that the compression to arrange (or form) the shape of the molded product should be minimal since excessive compression may result in consolidation of the surface of the molded product.

Unfortunately, in a case where the molded product is set in a housing, a lot of molded products are discarded due to a low dimensional accuracy thereof, so that the yield is low. The improvement of the yield requires the compression to arrange the shape of the molded product, although the compressed product has a low capability to remove the turbidity components.

RELATED ART DOCUMENTS

Patent Documents

Patent Document 1: JP-4064309B (Claims and paragraph [0036])
Patent Document 2: WO2011/016548 (Claims and paragraphs [0019] [0037])

SUMMARY OF THE INVENTION

Problems to be Solved by the Invention

It is therefore an object of the present invention to provide a water-processing filter having a high dimensional accuracy and an improved filterability (such as a capability to remove turbidity components), and a method for producing the filter.

Another object of the present invention is to provide a water-processing filter and a method for producing the filter, wherein the water-processing filter has a capability to remove free residual chlorine, volatile organic compounds (such as trihalomethanes), and turbidity components and a high dimensional accuracy for a cylindrical housing, and is producible with a high yield.

It is still another object of the present invention to provide a water-processing filter having an excellent filterability and a high strength, and a method for producing the filter.

Means to Solve the Problems

A cylindrical water-processing filter is produced by a slurry suction method, as disclosed in Japanese Patent No. 3516811 or others. The slurry suction method comprises sucking a slurry from the inside of a cylindrical forming die having small suction holes to accumulate the slurry on the surface of the die. Thus it is difficult to obtain the cylindrical filters having the same outer surface profile and the same dimension or size by the method. In order to set (or put) the filters in housings of standardized (or uniform) size, the outer surface of each filter is compressed on a workbench to uniformize the surface of the filter. As described above, the inventors of the present invention found that the compression treatment (rolling treatment) caused the reduction of filterability. In order to improve the filterability, the present inventors tried improving the dimensional accuracy by grinding the surface of the filter instead of the compression treatment, and surprisingly found out that, by adjusting the grinding conditions, the ground filter had not only an improved filterability compared with the compressed filter but also a higher dimensional accuracy and an improved filterability compared with the uncompressed filter (or the filter before compression). Although the reason to improve the filterability by grinding is unknown, this probably results from the following: the filter obtained by suction has an ununiform packing density in the thickness direction, and the tendency of ununiformity is more significant in an area at or near the outer surface of the filter, which is far from the inner surface from which the slurry is sucked. Further, since the granular activated carbon has a particle size distribution with a certain degree of breadth, the particle size distribution of the activated carbon probably has an influence on the packing density after suction. In particular, for a water-processing filter that should filter out turbidity components and volatile organic compounds simultaneously, it is probable that there is a complicated relation between the capability to allow the passage of water and the distribution state of the granular activated carbon and that the state of the surface in the initial filtration (the state of the upstream outer side) plays a key role in filterability.

The present inventors made intensive studies to achieve the above objects based on these findings and finally found that the dimensional accuracy and the filterability of a water-processing filter is improvable by adjusting an upstream outer surface of a cylindrical filter that contains a granular activated carbon having a median particle size of 30 to 80 μm and a fibrillated fibrous binder to have an arithmetical mean deviation of a waviness profile of not more than 30 μm and an arithmetical mean deviation of a primary profile of 35 to 45 μm. The present invention was accomplished based on the above findings.

That is, an aspect of the present invention provides a water-processing filter comprising (A) a hollow cylindrical filter which comprises (a1) a granular activated carbon having a median particle size of 30 to 80 μm and (a2) a fibrillated fibrous binder. The cylindrical filter (A) has an upstream outer surface having an arithmetical mean deviation of a waviness profile of not more than 30 μm and an arithmetical mean deviation of a primary profile of 35 to 45 μm. The cylindrical filter (A) may have a downstream inner surface having an arithmetical mean deviation of a primary profile of 0.5 to 1.5 times as large as the arithmetical mean deviation of the primary profile of the outer surface. The outer surface of the cylindrical filter (A) may be ground without compression.

The water-processing filter may further comprise (B) a hollow cylindrical filter disposed in a hollow space of the cylindrical filter (A); the cylindrical filter (B) may comprise (b1) a granular activated carbon having a median particle size of 30 to 80 μm and (b2) a granular binder. The density ratio of the cylindrical filter (A) relative to the cylindrical filter (B) may be the cylindrical filter (A)/the cylindrical filter (B)=0.7/1 to 1.5/1. The volume ratio of the cylindrical filter (A) relative to the cylindrical filter (B) may be the cylindrical filter (A)/the cylindrical filter (B)=3/1 to 20/1.

Another aspect of the present invention provides a method for producing (or manufacturing) the water-processing filter recited in claim 1, comprising the steps of: preparing a slurry by dispersing a mixture of (a1) a granular activated carbon and (a2) a fibrous binder in water, filtering the slurry by suction to give (A1) a premolded product, drying the premolded product (A1) to give (A2) a dried molded product, and grinding an outer surface of the molded product (A2). In the grinding step, the outer surface of the molded product (A2) may be ground at a grinding depth of about 5 to 200 times as large as a median particle size of the granular activated carbon (a1). The outer surface of the molded product (A2) may be ground while the molded product (A2) is rotated. The production method may further comprise the steps of: thermoforming a mixture of (b1) a granular activated carbon and (b2) a granular binder to give (B) a cylindrical filter, and inserting the cylindrical filter (B) into a hollow space of the cylindrical filter (A).

Effects of the Invention

According to the present invention, a cylindrical filter contains a granular activated carbon with a median particle size of 30 to 80 μm and a fibrillated fibrous binder and has an upstream outer surface adjusted to an arithmetical mean deviation of a waviness profile of not more than 30 μm and an arithmetical mean deviation of a primary profile of 35 to 45 μm, and the cylindrical filter provides a water-processing filter having improved dimensional accuracy and filterability. In particular, the water-processing filter is capable of removing free residual chlorine, volatile organic compounds, and turbidity components, has a high dimensional accuracy to a cylindrical housing, and is producible with a high yield. Further, in a case where a second cylindrical filter containing a granular activated carbon having a median particle size of 30 to 80 μm and a granular binder is disposed in a hollow space of the cylindrical filter, the resulting water-processing filter has not only an improved filterability but also an improved strength.

BRIEF DESCRIPTION OF DRAWINGS

FIG. 1 is a schematic perspective view of a water-processing filter in accordance with an embodiment of the present invention.

FIG. 2 is a schematic perspective view of an example of a grinder for producing a water-processing filter in accordance with an embodiment of the present invention.

DESCRIPTION OF EMBODIMENTS

[Cylindrical Filter (A)]

The water-processing filter of the present invention comprises (A) a hollow cylindrical filter which contains (a1) a granular activated carbon having a median particle size of 30 to 80 μm and (a2) a fibrillated fibrous binder. The cylindrical filter (A) has an outer surface on an upstream side of filtration and an inner surface on a downstream side of filtration. According to the present invention, since the outer surface of the cylindrical filter (A) is not subjected to a compression treatment (rolling treatment) and is obtained by grinding, the cylindrical filter (A) has a specific surface profile being different from both a surface profile of a cylindrical filter obtained by a slurry suction method and that of a filter obtained by compression-treating the outer surface of the filter. Thus the cylindrical filter (A) has an excellent dimensional accuracy, can be set (or put) in a standardized housing with a high yield, and can provide an improved filterability (such as a capability to remove turbidity components).

(Surface Profile)

Specifically, the cylindrical filter (A) has an outer surface having an arithmetical mean deviation of a waviness profile Wa of not more than 30 μm (particularly not more than 25 μm), for example, about 1 to 30 μm, preferably about 5 to 25 μm, and more preferably about 10 to 23 μm (particularly about 15 to 20 μm). A cylindrical filter having an arithmetical mean deviation of a waviness profile of more than 30 μm decreases in dimensional accuracy. Thus the cylindrical filter as a water-processing filter is difficult to install (or set) in a housing, and the yield of the filter is low. In a case where the cylindrical filter produced is smaller than a housing in consideration of easy installation, the cylindrical filter has a low filterability.

Further, the cylindrical filter (A) has an outer surface having an arithmetical mean deviation of a primary profile Pa of 35 to 45 μm, preferably about 36 to 44 μm (for example, about 36 to 42 μm), and more preferably about 37 to 40 μm (particularly about 37 to 39 μm). A cylindrical filter having an arithmetical mean deviation of a primary profile of less than 35 μm easily clogs with turbidity components probably due to a decreased (or narrower) distance between the granular activated carbons. In contrast, a cylindrical filter having an arithmetical mean deviation of a primary profile of over 45 μm has a low capability to remove turbidity components due to an excessively increased distance between the granular activated carbons.

The cylindrical filter (A) of which an outer surface is ground has a high uniformity of structure or packing density in a thickness direction thereof. The filter (A) has outer and inner surfaces that are highly uniform in surface structure.

The inner surface may have an arithmetical mean deviation of a waviness profile selected from the same range as that of the outer surface, for example, about 1 to 30 μm, preferably about 5 to 25 μm, and more preferably about 10 to 23 μm (particularly about 15 to 20 μm). The arithmetical mean deviation of the waviness profile of the inner surface may for example be about 0.5 to 2 times, preferably about 0.8 to 1.8 times, and more preferably about 1 to 1.6 times as large as that of the outer surface.

The inner surface may also have an arithmetical mean deviation of a primary profile selected from the same range as that of the outer surface, for example, about 35 to 45 μm, preferably about 36 to 44 μm (e.g., about 36 to 42 μm), and more preferably about 37 to 40 (particularly about 37 to 39 μm). The arithmetical mean deviation of the primary profile of the inner surface may for example be about 0.5 to 1.5 times, preferably about 0.6 to 1.4 times, and more preferably about 0.7 to 1.3 times (particularly about 0.8 to 1.2 times) as large as that of the outer surface.

In the description of this application, the arithmetical mean deviation of the waviness profile and the arithmetical mean deviation of the primary profile may be measured using a non-contact surface roughness measuring instrument in accordance with JIS B0601 (Jan. 20, 2001). The reason for using the non-contact surface roughness measuring instrument is that the surface of the filter is damaged due to a low hardness thereof by a stylus of a contact measuring instrument and thus it is difficult to measure these profiles accurately by the contact measuring instrument. Moreover, for the non-contact surface roughness measuring instrument, a microscope of 5 magnifications is usable. In a case where the magnification is excessively high, the height of the granular activated carbon tends to be seen as the height of the surface because the length to be evaluated is close to the particle size of the granular activated carbon. In a case where the magnification is excessively low, the accuracy of the roughness is low because these profiles observed are close to the minimum limits of detection and vary widely. Further, the measurement, may be conducted at a cutoff wavelength of 80 μm. In a case where the cutoff wavelength is not set, it is difficult to distinguish between the waviness and the roughness, and thus the accuracy of the waviness measurement is low. Specifically, the arithmetical mean deviation of the waviness profile and the arithmetical mean deviation of the primary profile may be measured by a method described in the after-mentioned Examples.

(Granular Activated Carbon (a1))

The water-processing filter of the present invention contains a granular activated carbon having a predetermined median particle size. The granular activated carbon (a1) has a median particle size of 30 to 80 μm, preferably about 30 to 60 μm, and more preferably about 35 to 55 μm (particular about 40 to 50 μm). In a case where the median particle size is less than 30 μm, the water-processing filter easily clogs with turbidity components. In a case where the median particle size is more than 60 μm, the water-processing filter has a low capability to remove turbidity components.

In the description of this application, the median particle size is a value measured by a laser diffraction/scattering method and means a diameter value of a particle whose volume-based cumulative fraction is 50% (D50) when a volume integral is obtained in descending order in a volume particle size distribution. The measurement by a laser diffraction/scattering method may be performed with, for example, a wet particle distribution measuring instrument ("MICROTRAC MT3300" manufactured by Nikkiso Co., Ltd.).

The granular activated carbon (a1) is obtainable by carbonizing and/or activating a carbonaceous material. If the carbonization is necessary, the carbonization may usually be performed, for example, at a temperature of about 400 to 800° C., preferably about 500 to 800° C., and more preferably about 550 to 750° C. in the absence of oxygen or air. The activation may be a gas activation or a chemical activation. The gas activation and the chemical activation may be used in combination. In particular, an activated carbon for purification of clean water is preferably obtained by the gas activation, which produces less residual impurities. The gas activation may usually be carried out by, for example, allowing a carbonized carbonaceous material to react with an activation gas (e.g., water vapor and carbon dioxide gas) at a temperature of about 700 to 1100° C., preferably about 800 to 980° C., and more preferably about 850 to 950° C. In consideration of safety and reactivity, the activation gas preferably includes a gas containing 10 to 40% by volume water vapor (a vapor-containing gas). The activation time and heating rate are not particularly limited to a specific one and can suitably be selected depending on the species, form, and size of a carbonaceous material to be selected.

The carbonaceous material may include, but should not be limited to, for example, a plant carbonaceous material [for example, a material derived from a plant, such as a wood, a sawdust, a charcoal, a fruit shell (such as a coconut shell or a walnut shell), a fruit seed, a by-product of pulp production, a lignin, or blackstrap molasses (or black treacle)], a mineral carbonaceous material (for example, a material derived from a mineral, such as peat, lignite, brown coal, bituminous coal, anthracite coal, coke, coal tar, coal tar pitch, petroleum distillation residue, or petroleum pitch), a synthetic-resin-series carbonaceous material [for example, a material derived from a synthetic resin, such as a phenolic resin, a poly(vinylidene chloride), or an acrylic resin], and a natural-fiber-series carbonaceous material [for example, a material derived from a natural fiber, such as a natural fiber (e.g., a cellulose) or a regenerated fiber (e.g., a rayon)]. These carbonaceous materials may be used alone or in combination. Among these carbonaceous materials, a coconut shell or a phenolic resin is preferred in respect that such a material easily forms developed micropores that involved in adsorption of volatile organic compounds defined in JIS S3201 (2010).

After activation, the activated carbon [in particular, an activated carbon derived from a plant carbonaceous material (such as a coconut shell) or a mineral carbonaceous material] may be washed for removing ash or chemical agents. For the washing, a mineral acid or water is used. The mineral acid preferably includes hydrochloric acid, which has a high washing efficiency.

The granular activated carbon (a1) may have a BET specific surface area, calculated by a nitrogen adsorption method, selected from the range of about 600 to 2000 $m^2/g$; for example, the BET specific surface area is about 800 to 1800 $m^2/g$, preferably about 900 to 1500 $m^2/g$, and more preferably about 1000 to 1300 m²/g. An activated carbon with an excessively large specific surface area has difficulty in adsorbing volatile organic compounds. An activated carbon with an excessively small specific surface area has a low capability to remove volatile organic compounds, CAT, or 2-MIB.

(Fibrous Binder (a2))

The fibrillated fibrous (or fiber) binder (a2) is not particularly limited to a specific one as far as the binder is a pulpy binder fiber which can be fibrillated using a high-pressure homogenizer or a high-speed disintegrator (or refiner) and entangled with a granular activated carbon so as to give a specific shape. As the fibrillated fibrous binder (a2), a wide variety of binders, including synthetic products and natural products, are available.

Concrete examples of the fiber constituting the fibrillated fibrous binder (a2) may include an acrylic fiber, a polyethylene fiber, a polypropylene fiber, a polyacrylonitrile fiber, a cellulose fiber, a polyamide fiber, and an aramid fiber. Among them, in light of easy fibrillation and high binding effect on the activated carbon, an acrylic fiber and a cellulose fiber are preferred. A commercially available product includes, for example, a homoacrylic pulp "Bi-PUL" manufactured by Japan Exlan Co., Ltd.

The fibrillated fibrous binder (a2) has an average fiber diameter of, for example, about 0.1 to 50 μm and preferably about 1 to 20 μm. The fibrillated fibrous binder (a2) has an average fiber length of, for example, about 0.5 to 4 mm and preferably about 1 to 2 mm.

The ratio of the fibrillated fibrous binder (a2) relative to 100 parts by mass of the granular activated carbon (a1) is, for example, about 1 to 10 parts by mass, preferably about 2 to 8 parts by mass, and more preferably about 3 to 7 parts by mass.

The cylindrical filter (A) has a thickness (a difference between the radius of the cylindrical filter and the radius of the hollow space) of not less than 5 mm. According to the size of a water purifier, for example, the cylindrical filter (A) may have a thickness of about 5 to 50 mm, preferably about 5 to 40 mm, and more preferably about 5 to 30 mm. A cylindrical filter (A) having an excessively small thickness has low filter characteristics and additionally has reduced grinding effects due to an increased uniformity of the outer surface and the inside of the filter.

The hollow space (inner portion) of the cylindrical filter (A) has a cylindrical form having an axis that is the same as the axis of the filter. The hollow space has a diameter of, for example, about 5 to 50 mm, preferably about 8 to 30 mm, and more preferably about 10 to 25 mm.

The cylindrical filter (A) has an apparent density of, for example, about 0.1 to 1 g/cm³, preferably about 0.2 to 0.8 g/cm³, and more preferably about 0.3 to 0.5 g/cm³.

[Cylindrical Filter (B)]

The water-processing filter of the present invention may comprise (A) a hollow cylindrical filter 1 and (B) a hollow cylindrical filter 2 disposed in a hollow space (inner portion) of the cylindrical filter (A) as shown in FIG. 1. The cylindrical filter (B) not only functions as a reinforcer (or a reinforcing material) with which the cylindrical filter (A) is reinforced but also possesses a capability to remove volatile organic compounds and turbidity components.

The cylindrical filter (B) contains (b1) a granular activated carbon having a median particle size of 30 to 80 μm and (b2) a granular binder. As the granular activated carbon, there may be used a granular activated carbon (a1) exemplified in the paragraph of the cylindrical filter (A), usually a granular activated carbon that is the same as the granular activated carbon (a1).

The granular binder (b2) may comprise a thermoplastic resin or a thermosetting resin. The granular binder (b2) may comprise, for example, a polyolefinic resin (e.g., a polyethylene, a polypropylene, an ethylene-vinyl acetate copolymer, an ethylene-(meth)acrylate copolymer, and an ethylene-(meth)acrylic acid copolymer), a styrenic resin (such as a polystyrene), an acrylic resin, a polyester-series resin, a polyamide-series resin, a polyurethane-series resin, an epoxy-series resin, and a silicone-series resin. These granular binders may be used alone or in combination.

Among these granular binders, a thermoplastic resin is widely used in light of moldability (or formability) or other characteristics. From the viewpoint of binding capacity, heat resistance, or other characteristics, a binder comprising (or formed from) a polyethylene is particularly preferred.

In light of excellent strength or formability, the granular binder (b2) has an average particle size of, for example, about 0.1 to 200 μm, preferably about 1.0 to 100 μm, and more preferably about 5 to 30 μm.

In consideration of well-balanced water flow resistance (hydraulic resistance), formability, and others, the ratio of the granular binder (b2) relative to 100 parts by mass of the granular activated carbon (b1) may be, for example, about 7 to 35 parts by mass, preferably about 8 to 30 parts by mass, and more preferably about 10 to 25 parts by mass.

The cylindrical filter (B) has an outer diameter without limitation as far as the cylindrical filter (B) can be disposed (or inserted) in the hollow space of the cylindrical filter (A). In light of filtration or other characteristics, it is preferred that the outer diameter of the cylindrical filter (B) be substantially the same as the outer diameter of the hollow space.

The cylindrical filter (B) has a thickness of, for example, about 1 to 10 mm, preferably about 1.2 to 8 mm, and more preferably about 1.5 to 5 mm.

The cylindrical filter (A) and the cylindrical filter (B) in a density ratio of the cylindrical filter (A)/the cylindrical filter (B) is about 0.7/1 to 1.5/1, preferably about 0.75/1 to 1.4/1, and more preferably about 0.8/1 to 1.3/1 (particularly about 0.8/1 to 1.2/1). In a case where the density ratio is too low, the water-processing filter tends to have a low capability to remove the turbidity components due to an excessive high density of the cylindrical filter (B). In contrast, in a case where the density ratio is too high, the cylindrical filter (B) tends to have a low strength.

The cylindrical filter (A) and the cylindrical filter (B) in a volume ratio of the cylindrical filter (A)/the cylindrical filter (B) is about 3/1 to 20/1, preferably about 4/1 to 18/1, and more preferably about 8/1 to 17/1. In a case where the volume ratio is too low, in other words, the ratio of the cylindrical filter (B) is excessively high, the water-processing filter tends to have a low capability to remove harmful substances (such as volatile organic compounds). In contrast, in a case where the volume ratio is too high, the water-processing filter tends to have a low strength or a low formability.

[Water-Processing Filter]

The water-processing filter of the present invention may comprise the cylindrical filter (A) alone. The water-processing filter may comprise the cylindrical filter (A) in combination with a reinforcer (or a reinforcing material). The reinforcer may be disposed (or inserted) in the hollow space of the cylindrical filter (A) (or may be disposed inside of the cylindrical filter (A)). The reinforcer may include a Netlon pipe and a ceramic filter. In order to improve the filterability by increasing the amount of the activated carbon in the water-processing filter, it is particularly preferred that the cylindrical filter (A) be used in combination with the cylindrical filter (B).

The water-processing filter of the present invention may optionally have a cap attached on a circular face of the cylindrical filter or may have a nonwoven fabric attached on the outer surface and/or the inner surface. Moreover, the water-processing filter may be used in combination with a conventional nonwoven fabric filter, ceramic filter medium, or others. Further, the water-processing filter of the present invention may contain a conventional additive, for example, a variety of adsorbents [such as a lead adsorbent (or an agent for adsorption of lead)] or mineral additives. The ratio of the additive relative to 100 parts by mass of the granular activated carbon is, for example, about 1 to 20 parts by mass, preferably about 3 to 15 parts by mass, and more preferably about 5 to 10 parts by mass.

The water-processing filter of the present invention has an excellent filtration characteristic for clean water, an excellent capability to remove free residual chlorine, volatile organic compounds (such as trihalomethanes), CAT (2-chloro-4,6-bisethylamino-1,3,5-triazine), and 2-MIB (2-methylisoborneol) as measured in accordance with JIS S3201(2010), and an excellent capability to remove turbidity components as measured in accordance with JIS S3201 (2010).

[Method for Producing Cylindrical Filter (A)]

The cylindrical filter (A) is obtainable by a production method that comprises the steps of: preparing a slurry by dispersing a mixture of the granular activated carbon (a1) and the fibrous binder (a2) in water (slurry preparation step), filtering the slurry by suction to give (A1) a premolded product (suction filtration step), drying the premolded product (A1) to give (A2) a dried molded product (drying step), and grinding an outer surface of the molded product (A2) (grinding step).

(Slurry Preparation Step)

In the slurry preparation step, the granular activated carbon (a1) and the fibrous binder (a2) are dispersed in water so that the resulting slurry can have a solid content of 0.1 to 10% by mass (particularly 1 to 5% by mass). In a case where the slurry has an excessively high solid content, the resulting molded product tends to lack in uniformity due to uneven dispersion in the slurry. In contrast, in a case where the slurry has an excessively low solid content, not only is the resulting molded product inefficiently produced because of a prolonged time for molding, but the molded product also tends to decrease in the capability to remove turbidity components due to a high density thereof.

(Suction Filtration Step)

In the suction filtration step, a forming die having a number of holes is placed in the slurry, and the slurry is filtered with the die by sucking the slurry from the inside of the die to form a certain shape. As the forming die, for example, a conventional die may be used. For example, a die as depicted in FIG. 1 of Japanese Patent No. 3516811 may be used. The suction method may include a conventional method, for example, a method using a suction pump.

(Drying Step)

In the drying step, the premolded product (A1) obtained in the suction filtration step is removed from the die and dried by a drier or other means to give the molded product (A2).

The drying temperature is, for example, about 100 to 150° C. (particularly about 110 to 130° C.). The drying time is, for example, about 4 to 24 hours (particularly about 8 to 16 hours). Too high a drying temperature causes degeneration or melting of the fibrillated fibrous binder, so that the resulting molded product tends to have a low filterability or a low strength. Too low a drying temperature easily makes the drying time longer or makes the dryness of the molded product insufficient.

(Grinding Step)

The grinding step is not particularly limited to a specific one as far as the outer surface of the dried molded product (A2) can be ground (or polished). A conventional grinding method may be used. In light of uniform grinding, the grinding step is preferably conducted by rotating the molded product (A2) itself.

FIG. 2 is an example of a grinder for grinding the molded product (A2) by rotating the molded product (A2) itself. A grinder 11 is provided with a disk-shaped grindstone (or a grinding wheel) 13 (having a grain size of 90 to 125 µm) for grinding a molded product 20, the grindstone 13 being attached to a rotation shaft 12; a rotation shaft 17 for rotatably fixing the molded product 20; and a control panel 19. The disk-shaped grindstone 13 is rotatable by a motor 14, is relatively movable forward and backward by a fixed air cylinder 15 so that the disk-shaped grindstone 13 can be allowed to contact with the molded product 20. The grindstone 13 is also movable together with the rotation shaft 12 along with a longitudinal or axial direction of the molded product 20 by a fixed air cylinder 16. Thus the disk-shaped grindstone 13 is allowed to contact with an outer surface of the molded product 20 to grind the outer surface of the molded product and is movable on the outer surface of the molded product along with the longitudinal direction of the molded product to uniformly grind the outer surface of the molded product in the longitudinal direction. Meanwhile, the rotation shaft 17 is also rotatable, by a motor 18, in a direction opposite to the direction of rotation of the disk-shaped grindstone. Since the grinder produces minute shavings uniform in size by rotating not only the molded product but also the disk-shaped grindstone, removal of the shavings is not needed. Thus the production efficiency can be improved.

Specifically, the molded product 20 is attached to the rotation shaft 17 that is disposed parallel to the rotation axis of the disk-shaped grindstone 13 disposed at the rotation shaft 12; the grindstone 13 has a diameter of 305 mmφ and a thickness of 19 mm. The molded product 20 is moved forward and backward and fixed at a certain position so that a desired outer diameter (grinding depth) can be obtained after grinding. The grinding depth (grinding thickness) is, for example, about 5 to 200 times, preferably about 10 to 100 times, and more preferably about 15 to 50 times as large as the median particle size of the granular activated carbon (a1). In a case where the grinding depth is too small, the grinding shows no effects. In a case where the grinding depth is too large, the production efficiency is low. According to the present invention, the production efficiency can be improved by producing the molded product (A2) being slightly larger in size than a housing in consideration of the grinding depth, according to the size of the housing. Moreover, shavings generated by grinding can be reduced. Further, the shavings may be recycled.

The disk-shaped grindstone may be rotated at a circumferential speed of, for example, about 10 to 35 m/s, preferably about 15 to 32 m/s, and more preferably about 18 to 30 m/s. The rotation shaft for rotating the disk-shaped grindstone may be rotated at a rotational speed of, for example, about 800 to 2200 rpm, preferably about 1000 to 2000 rpm, and more preferably about 1200 to 1800 rpm. Meanwhile, the rotation shaft for rotating the molded product may be rotated at a rotational speed of, for example, about 200 to 500 rpm and preferably about 300 to 450 rpm. In a case where the circumferential speed (rotational speed) is too low, the molded product is easily broken by grinding. In contrast, in a case where the circumferential speed is too high, the molded product is easily deformed or broken due to an overhigh centrifugal force.

The speed of the disk-shaped grindstone to be moved along the longitudinal direction of the molded product may be, for example, about 10 to 150 mm/second, preferably about 20 to 120 mm/second, and more preferably about 30 to 100 mm/second. In a case where the moving speed is too low, the production efficiency is reduced. In contrast, in a case where the moving speed is too high, the precision of grinding is decreased due to the undulation of the ground surface.

As the grindstone, a conventional grindstone may be used. For example, the grindstone may include an alumina grindstone, a silicon carbide grindstone, and a combination of an alumina grindstone and a silicon carbide grindstone. The grindstone contains an abrasive grain having a size (or a grain size) of, for example, about 30 to 600 μm, preferably about 40 to 300 μm, and more preferably about 45 to 180 μm. In a case where the abrasive grain is too coarse, the granular activated carbon easily falls off from the ground surface. In contrast, in a case where the abrasive grain is too fine, it takes a prolonged time for grinding, which tends to reduce the production efficiency.

The grindstone and the molded product (A2) are provided to be relatively movable toward or away from each other. The grindstone and the molded product (A2) may be provided so that at least one of them may be movable forward and backward.

The grindstone and the molded product (A2) are attached to a first shaft and a second shaft parallel to each other, respectively. At least one of the grindstone and the molded product may be provided to be movable (relatively movable) in the axial direction.

The grinding step is not particularly limited to the step of using the above-mentioned grinder. For example, the molded product fixed to the rotation shaft may be ground by a fixed plate-shaped grindstone. In this step, since the resulting shavings tend to accumulate on the ground surface, the grinding with air blowing is efficient.

[Method for Producing Cylindrical Filter (B)]

The cylindrical filter (B) is obtainable by a production method that comprises a step of thermoforming a mixture of the granular activated carbon (b1) and the granular binder (b2) to give (B) a cylindrical filter (molding step).

In the molding step, it is preferred to produce the cylindrical filter (B) by dry molding. Specifically, for example, there may be used an injection molding method that comprises a step of stirring and mixing the granular activated carbon (b1) and the granular binder (b2) in a predetermined ratio with a mixer (such as a Henschel mixer, a planetary mixer, or a V-shaped blender) and a step of molding the resulting mixture; the molding step comprises filling the mixture in a die, heating the die at a temperature of not lower than the melting point of the granular binder to melt or soften the granular binder, and then cooling the die for solidification.

Through a step of inserting the resulting cylindrical filter (B) into the hollow space of the cylindrical filter (A) (inserting step), a water-processing filter according to the present invention is obtained.

EXAMPLES

Hereinafter, the following examples are intended to describe this invention in further detail and should by no means be interpreted as defining the scope of the invention. Values of physical properties in Examples were measured by the following methods.

[Median Particle Size of Granular Activated Carbon]

A median particle size (D50) was measured by laser diffraction/scattering method using a wet particle size distribution measuring apparatus ("MICROTRAC MT3000" manufactured by Nikkiso Co., Ltd.).

[Apparent Density (g/cm$^3$)]

After a resulting cylindrical filter was dried at 120° C. for 2 hours, the apparent density (g/cm$^3$) was determined based on the measured weight (g) and volume (cm$^3$).

[Capability to Remove Turbidity]

A capability to remove turbidity components was measured in accordance with JIS S3201 (2010); provided that, in the test, the initial rate of a passing liquid was set to 3 liter/minute and then the rate of the passing liquid was adjusted so as to keep the dynamic water pressure at the initial liquid-passing state (or the pressure value at the initial rate of the passing liquid).

[Capability to Remove Free Residual Chlorine]

A capability to remove free residual chlorine was measured in accordance with JIS S3201 (2010); provided that the rate of a passing liquid was set to 3 liter/minute.

[Capability to Remove Total THM]

A capability to remove total THM (trihalomethanes) was measured in accordance with JIS S3201 (2010); provided that the rate of a passing liquid was set to 3 liter/minute.

[Initial Resistance to Passing Liquid]

An initial resistance to a liquid passing through a molded product was measured when the liquid was passed through the molded product at a rate of 3 liter/minute under the condition that the molded product was not wrapped around any filter or nonwoven fabric.

[Surface Profile]

An arithmetical mean deviation of a waviness profile Wa and an arithmetical mean deviation of a primary profile Pa were measured using a non-contact surface roughness measuring instrument ("LEXT OLS4000" manufactured by Olympus Corporation). The measurement conditions are shown below. These profiles were measured at any three (3) points (each of which was positioned at approximately the middle of each of three portions obtained by dividing a sample into three equal-length portions), and the average value was determined. Incidentally, for the sample of Example 1, a nonwoven fabric laminated on the outer inner surface of the sample was carefully separated from the sample, and then the profiles of the outer surface were measured.

Evaluation length: 2590 μm

Cutoff wavelength (λc): 80.0 μm

Filter: Gaussian Filter

Magnifications of microscope: 5 magnifications

[Collapse Strength]

A collapse strength was measured by applying pressure to a cylindrical filter at a speed of 2 mm/minute in the longitudinal direction of the cylindrical filter using a tensile and compression testing machine ("TENSILON RTC-1210A" manufactured by Orientec Co., Ltd.).

[Materials Used in Examples]

Activated carbon small particle: "PGW-20MD" manufactured by Kuraray Chemical Co., Ltd., coconut shell raw material, median particle size=47.9 μm, benzene adsorption=33%

Activated carbon large particle: "PGW-100MD" manufactured by Kuraray Chemical Co., Ltd., coconut shell raw material, median particle size=103.7 μm, benzene adsorption=33%

Titanosilicate-series adsorbent for adsorption of lead: "ATS" manufactured by BASF, average particle size=20 μm Fibrous binder: "Fibrillated acrylic pulp Bi-PUL/F" manufactured by Japan Exlan Co., Ltd.

Granular binder: high-density polyethylene powder, "MIPELON MP-200" manufactured by Mitsui Chemicals, Inc.

Cylindrical nonwoven fabric: nonwoven fabric "9540F" manufactured by Shinwa Corp. shaped into a cylindrical form Spunbonded nonwoven fabric: "T0703WDO" manufactured by Unitica Ltd.

Comparative Example 1

An activated carbon small particle (1.104 kg), a titanosilicate-series adsorbent for adsorption of lead (0.096 kg), and a fibrous binder (0.06 kg in terms of dry weight) were made to a 20-liter slurry with tap water.

A forming die depicted in FIG. 1 of Japanese Patent No. 3516811 (a tubular die having a large number of small suction holes) was provided. The forming die had an outer diameter (or a flange diameter) of 40 mmϕ, a shaft diameter of 12 mmϕ, and an inter-flange distance of 180 mm. A cylindrical nonwoven fabric was installed on the die. The die was placed into the slurry, and the slurry was accumulated on the die by suction to give a molded product until the molded product had an outer diameter of 40 mmϕ (corresponding to the outer diameter of the die). The resulting molded product was removed from the die, dried, and then cut to give a wet molded product having an outer diameter of 40 mmϕ, an inner diameter of 12 mmϕ, and a height of 54 mm (hereinafter, a molded product obtained by sucking a slurry is referred to as a wet molded product). The molded product weighed 24.51 g.

The outer side of the molded product was wrapped with a single layer of a spunbonded nonwoven fabric to give a test filter. The evaluation results of the water-processing filter are shown in Table 1 and Table 2.

Comparative Example 2

A slurry was prepared in the same composition and manner as in Comparative Example 1. A cylindrical nonwoven fabric was installed on a die having an outer diameter of 40 mmϕ, a shaft diameter of 12 mmϕ, and an inter-flange distance of 180 mm. The die was placed into the slurry, and the slurry was accumulated on the die by suction and then subjected to rotary compression molding (rotary molding) to give a molded product until the molded product had an outer diameter corresponding to the outer diameter of the die. The resulting molded product was dried and then cut to give a wet molded product having an outer diameter of 40 mmϕ, an inner diameter of 12 mmϕ, and a height of 54 mm. The molded product weighed 28.52 g.

The outer side of the molded product was wrapped with a single layer of a spunbonded nonwoven fabric to give a test filter. The evaluation results of the water-processing filter are shown in Table 1 and Table 2. The capability of this test filter to remove turbidity components was 0.51 times as large as that of Comparative Example 1.

Comparative Example 3

A slurry was prepared in the same composition and manner as in Comparative Example 1. A cylindrical nonwoven fabric was installed on a die having an outer diameter of 40 mmϕ, a shaft diameter of 15 mmϕ, and an inter-flange distance of 180 mm. The die was placed into the slurry, and the slurry was accumulated on the die by suction and then subjected to rotary compression molding to give a molded product until the molded product had an outer diameter corresponding to the outer diameter of the die. The resulting molded product was dried and then cut to give a wet molded product having an outer diameter of 40 mmϕ, an inner diameter of 15 mmϕ, and a height of 54 mm. The molded product weighed 27.12 g.

The outer side of the molded product was wrapped with a single layer of a spunbonded nonwoven fabric to give a test filter. The evaluation results of the water-processing filter are shown in Table 1 and Table 2. The capability of this test filter to remove turbidity components was 0.60 times as large as that of Comparative Example 1.

Comparative Example 4

A slurry was prepared in the same composition and manner as in Comparative Example 1. A cylindrical nonwoven fabric was installed on a die having an outer diameter of 40 mmϕ, a shaft diameter of 20 mmϕ, and an inter-flange distance of 180 mm. The die was placed into the slurry, and the slurry was accumulated on the die by suction and then subjected to rotary compression molding to give a molded product until the molded product had an outer diameter corresponding to the outer diameter of the die. The resulting molded product was dried and then cut to give a wet molded product having an outer diameter of 40 mmϕ, an inner diameter of 20 mmϕ, and a height of 54 mm. The molded product weighed 23.04 g.

The outer side of the molded product was wrapped with a single layer of a spunbonded nonwoven fabric to give a test filter. The evaluation results of the water-processing filter are shown in Table 1 and Table 2. The capability of this test filter to remove turbidity components was 0.51 times as large as that of Comparative Example 1.

Example 1

A slurry was prepared in the same composition and manner as in Comparative Example 1. A cylindrical nonwoven fabric was installed on a die having an outer diameter of 40 mmϕ, a shaft diameter of 12 mmϕ, and an inter-flange distance of 180 mm. The die was placed into the slurry, and the slurry was accumulated on the die by suction to give a molded product so that the molded product had an outer diameter about 2 mm larger than the outer diameter of the die. The molded product was dried. The resulting molded product was installed on an automatic grinder shown in FIG. 2, and the outer surface of the molded product was ground at a speed of the molded product of 300 rpm, a speed of the grindstone of 1200 rpm, and a moving speed of the grindstone of 300 mm/10 sec. (3 cm/sec.) to give a molded product having an outer diameter of 40 mmϕ, an inner diameter of 12 mmϕ, and a height of 180 mm. The resulting molded product was cut to give a wet molded product having an outer diameter of 40 mmϕ, an inner diameter of 12 mmϕ, and a height of 54 mm. The molded product weighed 24.93 g.

The outer side of the molded product was wrapped with a single layer of a spunbonded nonwoven fabric to give a test filter. The evaluation results of the water-processing filter are shown in Table 1 and Table 2. Due to an effect of grinding, the capability of this test filter to remove turbidity components was 1.2 times or more as large as that of Comparative Example 1, and 2.3 times or more as large as that of Comparative Example 2.

Example 2

A slurry was prepared in the same composition and manner as in Comparative Example 1. A cylindrical nonwoven fabric was installed on a die having an outer diameter of 40 mmϕ, a shaft diameter of 15 mmϕ, and an inter-flange distance of 180 mm. The die was placed into the slurry, and the slurry was accumulated on the die by suction to give a molded product so that the molded product had an outer diameter about 2 mm larger than the outer diameter of the die. The molded product was dried. The outer surface of the molded product was ground by a grinder in the same manner as in Example 1 to give a molded product having an outer diameter of 40 mmϕ, an inner diameter of 15 mmϕ, and a height of 180 mm. The resulting molded product was cut to give a wet molded product having an outer diameter of 40 mmϕ, an inner diameter of 15 mmϕ, and a height of 54 mm. The molded product weighed 23.80 g.

The outer side of the molded product was wrapped with a single layer of a spunbonded nonwoven fabric to give a test filter. The evaluation results of the water-processing filter are shown in Table 1 and Table 2. Due to an effect of grinding, the capability of this test filter to remove turbidity components was 1.8 times or more as large as that of Comparative Example 3.

Example 3

A slurry was prepared in the same composition and manner as in Comparative Example 1. A cylindrical nonwoven fabric was installed on a die having an outer diameter of 40 mmϕ, a shaft diameter of 20 mmϕ, and an inter-flange distance of 180 mm. The die was placed into the slurry, and the slurry was accumulated on the die by suction to give a molded product so that the molded product had an outer diameter about 2 mm larger than the outer diameter of the die. The molded product was dried. The outer surface of the molded product was ground by a grinder in the same manner as in Example 1 to give a molded product having an outer diameter of 40 mmϕ, an inner diameter of 20 mmϕ, and a height of 180 mm. The resulting molded product was cut to give a wet molded product having an outer diameter of 40 mmϕ, an inner diameter of 20 mmϕ, and a height of 54 mm. The molded product weighed 20.09 g.

The outer side of the molded product was wrapped with a single layer of a spunbonded nonwoven fabric to give a test filter. The evaluation results of the water-processing filter are shown in Table 1 and Table 2. Due to an effect of grinding, the capability of this test filter to remove turbidity components was 1.9 times or more as large as that of Comparative Example 4.

Example 4

An activated carbon small particle (6.8 kg) and a granular binder (1.2 kg) were put in a mixer ("Micro Speed Mixer MS-25 type" manufactured by Takara Koki Co., Ltd.) and stirred for 2 minutes. A cylindrical stainless-steel die having an inner diameter of 15 mmϕ, a center core diameter of 12 mmϕ, and a height of 120 mm was provided. A lid was placed on one side (or open side) of the die, and the die was gradually filled with the resulting mixture while being vibrated using a wooden hammer. Another lid was placed on the other side (or open side) of the die, and the contents were fixed. The die filled with the mixture was put in a drying machine at 160° C., heated for 120 minutes, and then allowed to cool to not higher than 50° C. Both lids were removed from the die, and the die was removed without damaging the molded product. The resulting molded product was cut to give a dry molded product having an outer diameter of 15 mmϕ, an inner diameter of 12 mmϕ, and a height of 54 mm (hereinafter, a molded product obtained by molding in the absence of water is referred to as a dry molded product). The dry molded product weighed 1.28 g.

The resulting dry molded product was inserted into the inner portion of a wet molded product obtained in the same manner as in Example 2 to give a composite molded product having an outer diameter of 40 mmϕ, an inner diameter of 12 mmϕ, and a height of 54 mm. The wet molded product weighed 23.81 g.

The evaluation results of the water-processing filter are shown in Table 1 and Table 2. Due to an effect of grinding, the capability of this filter to remove turbidity components was 1.3 times or more as large as that of Comparative Example 1, and 2.6 times or more as large as that of Comparative Example 2.

Example 5

A slurry was prepared in the same composition and manner as in Comparative Example 1. A cylindrical nonwoven fabric was installed on a die having an outer diameter of 40 mmϕ, a shaft diameter of 18 mmϕ, and an inter-flange distance of 180 mm. The die was placed into the slurry, and the slurry was accumulated on the die by suction to give a molded product so that the molded product had an outer diameter about 2 mm larger than the outer diameter of the die. The molded product was dried. The outer surface of the molded product was ground by a grinder in the same manner as in Example 1 to give a molded product having an outer diameter of 40 mmϕ, an inner diameter of 18 mmϕ, and a height of 180 mm. The resulting molded product was cut to give a wet molded product having an outer diameter of 40 mmϕ, an inner diameter of 18 mmϕ, and a height of 54 mm. The wet molded product weighed 21.64 g. The outer side of the molded product was wrapped with a single layer of a spunbonded nonwoven fabric.

A mixture for dry molded product was prepared in the same composition and manner as in Example 4. A cylindrical stainless-steel die having an inner diameter of 18 mmϕ, a center core diameter of 12 mmϕ, and a height of 120 mm was provided. A lid was placed on one side (or open side) of the die. Using the die, a molded product was produced in the same procedure as in Example 4. The resulting molded product was cut to give a dry molded product having an outer diameter of 18 mmϕ, an inner diameter of 12 mmϕ, and a height of 54 mm. The dry molded product weighed 3.61 g.

The resulting dry molded product was inserted into the inner portion of the wet molded product to give a composite molded product having an inner diameter of 12 mmϕ, an outer diameter of 40 mmϕ, and a height of 54 mm. The evaluation results of the water-processing filter are shown in Table 1 and Table 2. Due to an effect of grinding, the capability of this filter to remove turbidity components was 1.2 times as large as that of Comparative Example 1, and 2.4 times or more as large as that of Comparative Example 2.

Example 6

A mixture for dry molded product was prepared in the same composition and manner as in Example 4. A cylindrical stainless-steel die having an inner diameter of 20 mmϕ, a center core diameter of 12 mmϕ, and a height of 120 mm was provided. A lid was placed on one side (or open side) of the die. Using the die, a molded product was produced in the same procedure as in Example 4. The resulting molded product was cut to give a dry molded product having an outer diameter of 20 mmϕ, an inner diameter of 12 mmϕ, and a height of 54 mm. The dry molded product weighed 5.19 g.

The resulting dry molded product was inserted into the inner portion of a wet molded product obtained in the same manner as in Example 3 to give a composite molded product having an outer diameter of 40 mmϕ, an inner diameter of 12 mmϕ, and a height of 54 mm. The wet molded product weighed 20.52 g.

The evaluation results of the water-processing filter are shown in Table 1 and Table 2. Due to an effect of grinding, the capability of this filter to remove turbidity components was 1.1 times or more as large as that of Comparative Example 1, and 2.2 times or more as large as that of Comparative Example 2.

Example 7

A slurry was prepared in the same composition and manner as in Comparative Example 1. A cylindrical nonwoven fabric was installed on a die having an outer diameter of 40 mmϕ, a shaft diameter of 23 mmϕ, and an inter-flange distance of 180 mm. The die was placed into the slurry, and the slurry was accumulated on the die by suction to give a molded product so that the molded product had an outer diameter about 2 mm larger than the outer diameter of the die. The molded product was dried. The outer surface of the molded product was ground by a grinder in the same manner as in Example 1 to give a molded product having an outer diameter of 40 mmϕ, an inner diameter of 23 mmϕ, and a height of 180 mm. The resulting molded product was cut to give a wet molded product having an outer diameter of 40 mmϕ, an inner diameter of 23 mmϕ, and a height of 54 mm. The wet molded product weighed 17.69 g. The outer side of the molded product was wrapped with a single layer of a spunbonded nonwoven fabric.

A mixture for dry molded product was prepared in the same composition and manner as in Example 4. A cylindrical stainless-steel die having an inner diameter of 23 mmϕ, a center core diameter of 12 mmϕ, and a height of 120 mm was provided. A lid was placed on one side (or open side) of the die. Using the die, a molded product was produced in the same procedure as in Example 4. The resulting molded product was cut to give a dry molded product having an outer diameter of 23 mmϕ, an inner diameter of 12 mmϕ, and a height of 54 mm. The dry molded product weighed 8.46 g.

The resulting dry molded product was inserted into the inner portion of the wet molded product to give a composite molded product having an outer diameter of 40 mmϕ, an inner diameter of 12 mmϕ, and a height of 54 mm. The evaluation results of the water-processing filter are shown in Table 1 and Table 2. Due to an effect of grinding, the capability of this filter to remove turbidity components was 2 times or more as large as that of Comparative Example 2.

Example 8

A slurry was prepared in the same composition and manner as in Comparative Example 1. A cylindrical nonwoven fabric was installed on a die having an outer diameter of 40 mmϕ, a shaft diameter of 12 mmϕ, and an inter-flange distance of 180 mm. The die was placed into the slurry, and the slurry was accumulated on the die by suction to give a molded product so that the molded product had an outer diameter about 2 mm larger than the outer diameter of the die. The molded product was dried. The resulting molded product was installed on an automatic grinder shown in FIG. 2, and the outer surface of the molded product was ground at a speed of the molded product of 450 rpm, a speed of the grindstone of 1800 rpm, and a moving speed of the grindstone of 300 mm/3.5 sec. (8.6 cm/sec.) to give a molded product having an outer diameter of 40 mmϕ, an inner diameter of 12 mmϕ, and a height of 180 mm. The resulting molded product was cut to give a wet molded product having an outer diameter of 40 mmϕ, an inner diameter of 12 mmϕ, and a height of 54 mm. The wet molded product weighed 24.93 g. The outer side of the molded product was wrapped with a single layer of a spunbonded nonwoven fabric to give a test filter.

The evaluation results of the water-processing filter are shown in Table 1 and Table 2. Due to an effect of grinding, the capability of this test filter to remove turbidity components was 1.2 times or more as large as that of Comparative Example 1, and 2.3 times or more as large as that of Comparative Example 2.

Example 9

A slurry was prepared in the same composition and manner as in Comparative Example 1. A cylindrical nonwoven fabric was installed on a die having an outer diameter of 40 mmϕ, a shaft diameter of 12 mmϕ, and an inter-flange distance of 180 mm. The die was placed into the slurry, and the slurry was accumulated on the die by suction to give a molded product so that the molded product had an outer diameter about 2 mm larger than the outer diameter of the die. The molded product was dried. The resulting molded product was installed on an automatic grinder shown in FIG. 2, and the outer surface of the molded product was ground at a speed of the molded product of 300 rpm, a speed of the grindstone of 1800 rpm, and a moving speed of the grindstone of 300 mm/5 sec. (6 cm/sec.) to give a molded product having an outer diameter of 40 mmϕ, an inner diameter of 12 mmϕ, and a height of 180 mm. The resulting molded product was cut to give a wet molded product having an outer diameter of 40 mmϕ, an inner diameter of 12 mmϕ, and a height of 54 mm. The wet molded product weighed 24.93 g. The outer side of the molded product was wrapped with a single layer of a spunbonded nonwoven fabric to give a test filter.

The evaluation results of the water-processing filter are shown in Table 1 and Table 2. Due to an effect of grinding, the capability of this test filter to remove turbidity components was 1.2 times or more as large as that of Comparative Example 1, and 2.3 times or more as large as that of Comparative Example 2.

Example 10

A wet molded product was produced in the same manner as in Example 1 except that the composition of the slurry was an activated carbon small particle (0.552 kg), an activated carbon large particle (0.552 kg), a titanosilicate-series adsorbent for adsorption of lead (0.096 kg), and a fibrous binder (0.06 kg in terms of dry weight). The activated carbon contained in the molded product had a median particle size of 66.3 μm. The molded product weighed 24.42 g. The outer side of the molded product was wrapped with a single layer of a spunbonded nonwoven fabric to give a test filter.

The evaluation results of the water-processing filter are shown in Table 1 and Table 2. The test filter had a low capability to remove turbidity components because the activated carbon had a median particle size larger than those of other Examples.

Example 11

An activated carbon large particle (4.0 kg) and a granular binder (4.0 kg) were put in a mixer ("Micro Speed Mixer MS-25 type" manufactured by Takara Koki Co., Ltd.) and stirred for 2 minutes. A cylindrical stainless-steel die having an inner diameter of 18 mmφ, a center core diameter of 12 mmφ, and a height of 200 mm was provided. A lid was placed on one side (or open side) of the die, and the die was gradually filled with the resulting mixture while being vibrated using a wooden hammer. Another lid was placed on the other side (or open side) of the die, and the contents were fixed. The die filled with the mixture was put in a drying machine at 160° C., heated for 120 minutes, and then allowed to cool to not higher than 50° C. Both lids were removed from the die, and the die was removed without damaging the molded product. The resulting molded product was cut to give a dry molded product having an outer diameter of 18 mmφ, an inner diameter of 12 mmφ, and a height of 200 mm. The dry molded product weighed 13.67 g.

A slurry was prepared in the same composition and manner as in Comparative Example 1. The resulting dry molded product was installed on a die having an outer diameter of 40 mmφ, a shaft diameter of 12 mmφ, and an inter-flange distance of 180 mm. The die was placed into the slurry, and the slurry was accumulated on the die by suction to give a molded product so that the molded product had an outer diameter about 2 mm larger than the outer diameter of the die. The molded product was dried. The outer surface of the resulting molded product was ground by a grinder in the same manner as in Example 1 to give a molded product having an outer diameter of 40 mmφ, an inner diameter of 12 mmφ, and a height of 180 mm. The resulting molded product was cut to give an integrally molded product (a molded product composed of the dry molded product and the wet molded product) having an outer diameter of 40 mmφ, an inner diameter of 12 mmφ, and a height of 54 mm. The integrally molded product weighed 25.85 g. Based on the weight of the dry molded product used, the weight of the wet molded product in the integrally molded product was determined to be 21.72 g, and that of the dry molded product was determined to be 4.13 g. The outer side of the integrally molded product was wrapped with a single layer of a spunbonded nonwoven fabric to give a test filter.

The evaluation results of the water-processing filter are shown in Table 1 and Table 2. Due to an effect of grinding, the capability of this test filter to remove turbidity components was 1.3 times as large as that of Comparative Example 1, and 2.6 times as large as that of Comparative Example 2.

Comparative Example 5

A slurry was prepared in the same composition and manner as in Comparative Example 1. A cylindrical nonwoven fabric was installed on a die having an outer diameter of 40 mmφ, a shaft diameter of 12 mmφ, and an inter-flange distance of 180 mm. The die was placed into the slurry, and the slurry was accumulated on the die by suction to give a molded product so that the molded product had an outer diameter about 2 mm larger than the outer diameter of the die. The molded product was dried. The resulting molded product was installed on an automatic grinder shown in FIG. 2, and the outer surface of the molded product was ground at a speed of the molded product of 300 rpm, a speed of the grindstone of 300 rpm, and a moving speed of the grindstone of 300 mm/10 sec. (3 cm/sec.) The ground site was collapsed, and a molded product having a uniform shape could not be obtained.

Comparative Example 6

An activated carbon large particle (1.104 kg), a titanosilicate-series adsorbent for adsorption of lead (0.096 kg), and a fibrous binder (0.06 kg in terms of dry weight) were made to a 20-liter slurry with tap water.

A forming die depicted in FIG. 1 of Japanese Patent No. 3516811 (a tubular die having a large number of small suction holes) was provided. The forming die had an outer diameter (flange diameter) of 40 mmφ, a shaft diameter of 12 mmφ, and an inter-flange distance of 180 mm. A cylindrical nonwoven fabric was installed on the die. The die was placed into the slurry, and the slurry was accumulated on the die by suction to give a molded product until the molded product had an outer diameter of 40 mmφ (corresponding to the outer diameter of the die). The resulting molded product was removed from the die, dried, and then cut to give a wet molded product having an outer diameter of 40 mmφ, an inner diameter of 12 mmφ, and a height of 54 mm.

The outer side of the molded product was wrapped with a single layer of a spunbonded nonwoven fabric to give a test filter. The resulting molded product weighed 29.56 g.

Table 1 and Table 2 show the capability of the water-processing filter to remove volatile organic compounds and the capability of the filter to remove turbidity components. The filter had no capability to remove turbidity components because the activated carbon used had a larger particle size compared with Example 1.

Comparative Example 7

A slurry was prepared in the same composition and manner as in Comparative Example 6. A cylindrical nonwoven fabric was installed on a die having an outer diameter of 40 mmφ, a shaft diameter of 12 mmφ, and an inter-flange distance of 180 mm. The die was placed into the slurry, and the slurry was accumulated on the die by suction to give a molded product so that the molded product had an outer diameter about 2 mm larger than the outer diameter of the die. The molded product was dried.

The resulting molded product was installed on an automatic grinder shown in FIG. 2, and the outer surface of the molded product was ground at a speed of the molded product of 300 rpm, a speed of the grindstone of 1200 rpm, and a moving speed of the grindstone of 300 mm/10 sec. (3 cm/sec.) to give a molded product having an outer diameter of 40 mmφ, an inner diameter of 12 mmφ, and a height of 180 mm. The resulting molded product was cut to give a wet molded product having an outer diameter of 40 mmφ, an inner diameter of 12 mmφ, and a height of 54 mm.

The outer side of the molded product was wrapped with a single layer of a spunbonded nonwoven fabric to give a test filter. The resulting molded product weighed 25.54 g.

Table 1 and Table 2 show the capability of the water-processing filter to remove volatile organic compounds and the capability of the filter to remove turbidity components. The filter had no capability to remove turbidity components because the activated carbon used had a larger particle size compared with Example 1. The filter also had a lower capability to remove free residual chlorine and total THM.

Comparative Example 8

An activated carbon small particle (6.8 kg) and a granular binder (1.2 kg) were put in a mixer ("Micro Speed Mixer MS-25 type" manufactured by Takara Koki Co., Ltd.) and stirred for 2 minutes. A cylindrical stainless-steel die having an inner diameter of 40 mmφ, a center core diameter of 12 mmφ, and a height of 120 mm was provided. A lid was placed on one side (or open side) of the die, and the die was gradually filled with the resulting mixture while being vibrated using a wooden hammer. Another lid was placed on the other side (or open side) of the die, and the contents were fixed. The die filled with the mixture filled was put in a drying machine at 160° C., heated for 120 minutes, and then allowed to cool to not higher than 50° C. Both lids were removed from the die, and the die was removed without damaging the molded product. The resulting molded product was cut to give a dry molded product having an outer diameter of 40 mmφ, an inner diameter of 12 mmφ, and a height of 54 mm. The capability of this molded product to remove turbidity components was low and 0.23 times as large as that of Comparative Example 1, and 0.45 times as large as that of Comparative Example 2. In addition, the residual chlorine test could not continue at a passing liquid of 5580 L due to a high resistance to passing liquid, and then the test discontinued.

TABLE 1

| | Kind of filter | Rotary compression | Grinding | Size of molded product | Volume (ml) | Weight (g) | Density (g/cm³) | Volume ratio (A/B) | Density ratio (A/B) | Rotational speed of grindstone (rpm) | Moving speed of grindstone (cm/s) | Rotational speed of molded product (rpm) |
|---|---|---|---|---|---|---|---|---|---|---|---|---|
| Comparative Example 1 | Cylindrical A2 | No | No grinding | 40φ × 12φ × 54 | 62.18 | 24.51 | 0.39 | — | — | — | — | — |
| Comparative Example 2 | Cylindrical A2 | Yes | No grinding | 40φ × 12φ × 54 | 62.18 | 28.52 | 0.46 | — | — | — | — | — |
| Comparative Example 3 | Cylindrical A2 | Yes | No grinding | 40φ × 15φ × 54 | 58.72 | 27.12 | 0.46 | — | — | — | — | — |
| Comparative Example 4 | Cylindrical A2 | Yes | No grinding | 40φ × 20φ × 54 | 51.24 | 23.04 | 0.45 | — | — | — | — | — |
| Example 1 | Cylindrical A | No | Grinding | 40φ × 12φ × 54 | 62.18 | 24.93 | 0.40 | — | — | 1200 | 3 | 300 |
| Example 2 | Cylindrical A | No | Grinding | 40φ × 15φ × 54 | 58.72 | 23.80 | 0.41 | — | — | 1200 | 3 | 300 |
| Example 3 | Cylindrical A | No | Grinding | 40φ × 20φ × 54 | 51.24 | 20.09 | 0.39 | — | — | 1200 | 3 | 300 |
| Example 4 | Cylindrical A | No | Grinding | 40φ × 15φ × 54 | 58.72 | 23.81 | 0.41 | 16.98 | 1.10 | 1200 | 3 | 300 |
| | Cylindrical B | — | — | 15φ × 12φ × 54 | 3.46 | 1.28 | 0.37 | | | — | — | — |
| Example 5 | Cylindrical A | No | Grinding | 40φ × 18φ × 54 | 54.49 | 21.64 | 0.40 | 7.09 | 0.85 | 1200 | 3 | 300 |
| | Cylindrical B | — | — | 18φ × 12φ × 54 | 7.69 | 3.61 | 0.47 | | | — | — | — |
| Example 6 | Cylindrical A | No | Grinding | 40φ × 20φ × 54 | 51.24 | 20.52 | 0.40 | 4.69 | 0.84 | 1200 | 3 | 300 |
| | Cylindrical B | — | — | 20φ × 12φ × 54 | 10.93 | 5.19 | 0.47 | | | — | — | — |
| Example 7 | Cylindrical A | No | Grinding | 40φ × 23φ × 54 | 45.74 | 17.69 | 0.39 | 2.78 | 0.75 | 1200 | 3 | 300 |
| | Cylindrical B | — | — | 23φ × 12φ × 54 | 16.44 | 8.46 | 0.51 | | | — | — | — |
| Example 8 | Cylindrical A | No | Grinding | 40φ × 12φ × 54 | 62.18 | 24.96 | 0.40 | — | — | 1800 | 8.6 | 450 |
| Example 9 | Cylindrical A | No | Grinding | 40φ × 12φ × 54 | 62.18 | 24.94 | 0.40 | — | — | 1800 | 6 | 300 |
| Example 10 | Cylindrical A | No | Grinding | 40φ × 12φ × 54 | 62.18 | 24.42 | 0.39 | — | — | 1200 | 3 | 300 |
| Example 11 | Cylindrical A | No | Grinding | 40φ × 18φ × 54 | 54.49 | 21.72 | 0.40 | 7.09 | 0.74 | 1200 | 3 | 300 |
| | Cylindrical B | — | — | 18φ × 12φ × 54 | 7.69 | 4.13 | 0.54 | | | — | — | — |
| Comparative Example 5 | Cylindrical A | No | Grinding | 40φ × 12φ × 54 | — | — | — | — | — | 300 | 3 | 300 |
| Comparative Example 6 | Cylindrical A | Yes | No grinding | 40φ × 12φ × 54 | 62.18 | 29.56 | 0.48 | — | — | — | — | — |
| Comparative Example 7 | Cylindrical A | No | Grinding | 40φ × 12φ × 54 | 62.18 | 25.54 | 0.41 | — | — | 1200 | 3 | 3000 |
| Comparative Example 8 | — | — | — | 40φ × 12φ × 54 | 62.18 | 30.16 | 0.49 | — | — | — | — | — |

TABLE 2

| | Kind of filter | Median particle size of activated carbon (μm) | Waviness Wa (μm) | Deviation Pa (μm) | Removal of turbidity components (L) | Removal of free residual chlorine (L) | Removal of total THM (L) | Initial resistance to passing liquid (MPa) | Collapse strength (N) |
|---|---|---|---|---|---|---|---|---|---|
| Comparative Example 1 | Cylindrical A2 | 47.9 | 44.3 | 47.1 | 430 | 8870 | 1130 | 0.071 | 735.5 |
| Comparative Example 2 | Cylindrical A2 | 47.9 | 12.7 | 30.5 | 220 | 10860 | 1380 | 0.164 | 809.5 |
| Comparative Example 3 | Cylindrical A2 | 47.9 | 11.6 | 27.9 | 260 | 10120 | 1290 | 0.117 | 739.5 |
| Comparative Example 4 | Cylindrical A2 | 47.9 | 12.1 | 30.4 | 220 | 8000 | 1020 | 0.082 | 575.5 |
| Example 1 | Cylindrical A | 47.9 | 18.6 | 37.5 | 520 | 8990 | 1210 | 0.072 | 766.5 |
| Example 2 | Cylindrical A | 47.9 | 18.8 | 38.6 | 470 | 8390 | 1010 | 0.070 | 687.5 |
| Example 3 | Cylindrical A | 47.9 | 23.7 | 38.7 | 420 | 6460 | 830 | 0.026 | 547.5 |
| Example 4 | Cylindrical A Cylindrical B | 47.9 47.9 | 18.8 — | 38.6 — | 580 | 8840 | 1050 | 0.094 | 896.5 |
| Example 5 | Cylindrical A Cylindrical B | 47.9 47.9 | 18.6 — | 37.5 — | 530 | 8670 | 1080 | 0.102 | 958 |
| Example 6 | Cylindrical A Cylindrical B | 47.9 47.9 | 21.2 — | 38.1 — | 500 | 8570 | 1090 | 0.108 | 999.5 |
| Example 7 | Cylindrical A Cylindrical B | 47.9 47.9 | 23.7 — | 38.7 — | 450 | 8270 | 1100 | 0.118 | 1061.5 |
| Example 8 | Cylindrical A | 47.9 | 26.6 | 41.2 | 520 | 8990 | 1210 | 0.072 | 766.5 |
| Example 9 | Cylindrical A | 47.9 | 22.9 | 38.8 | 520 | 8990 | 1210 | 0.072 | 766.5 |
| Example 10 | Cylindrical A | 66.3 | 25.9 | 40.8 | 360 | 6840 | 1010 | 0.050 | 774.5 |
| Example 11 | Cylindrical A Cylindrical B | 47.9 103.7 | 18.7 — | 38.1 — | 590 | 8850 | 1060 | 0.095 | 898.2 |
| Comparative Example 5 | Cylindrical A | 47.9 | 71.1 | 91.9 | — | — | — | — | — |
| Comparative Example 6 | Cylindrical A | 103.7 | 29.6 | 45.7 | 0 | — | — | — | 848.5 |
| Comparative Example 7 | Cylindrical A | 103.7 | 32.7 | 45.2 | 0 | 4350 | 780 | 0.032 | 780 |
| Comparative Example 8 | — | 47.9 | 17.5 | 35.9 | 100 | >5580 | 1500 | 0.114 | 2010 |

INDUSTRIAL APPLICABILITY

The water-processing filter of the present invention is usable as a filter for household or industrial water purifiers.

DESCRIPTION OF REFERENCE NUMERALS

1 . . . Cylindrical filter (A)
2 . . . Cylindrical filter (B)
11 . . . Grinder
12, 17 . . . Rotation shaft
13 . . . Disk-shaped grindstone
14, 18 . . . Motor
15, 16 . . . Air cylinder
19 . . . Control panel
20 . . . Molded product

The invention claimed is:

1. A water-processing filter comprising (A) a hollow cylindrical filter which comprises (a1) a granular activated carbon having a median particle size of from 30 to 80 μm and (a2) a fibrillated fibrous binder, wherein the cylindrical filter (A) has an upstream outer surface having an arithmetical mean deviation of a waviness profile in accordance with JIS B 0601 of not more than 30 μm and an arithmetical mean deviation of a primary profile in accordance with JIS B 0601 of from 35 to 45 μm.

2. The water-processing filter according to claim 1, further comprising (B) a hollow cylindrical filter disposed in a hollow space of the cylindrical filter (A), wherein the cylindrical filter (B) comprises (b1) a granular activated carbon having a median particle size of from 30 to 80 μm and (b2) a granular binder.

3. The water-processing filter according to claim 2, wherein a density ratio of the cylindrical filter (A) relative to the cylindrical filter (B) is the cylindrical filter (A)/the cylindrical filter (B)=0.7/1 to 1.5/1.

4. The water-processing filter according to claim 2, wherein a volume ratio of the cylindrical filter (A) relative to the cylindrical filter (B) is the cylindrical filter (A)/the cylindrical filter (B)=3/1 to 20/1.

5. The water-processing filter according to claim 1, wherein the cylindrical filter (A) has a downstream inner surface having an arithmetical mean deviation of a primary profile of from 0.5 to 1.5 times as large as the arithmetical mean deviation of the primary profile of the outer surface.

6. The water-processing filter according to claim 1, wherein the outer surface of the cylindrical filter (A) is ground without compression.

7. A method for producing a water-processing filter of claim 1, the method comprising:
preparing a slurry by dispersing a mixture of (a1) a granular activated carbon and (a2) a fibrous binder in water,
filtering the slurry by suction to give (A1) a premolded product,
drying the premolded product (A1) to give (A2) a dried molded product, and
grinding an outer surface of the molded product (A2).

8. The method according to claim 7, wherein, in the grinding, the outer surface of the molded product (A2) is ground at a grinding depth of from 5 to 200 times as large as a median particle size of the granular activated carbon (a1).

9. The method according to claim 7, wherein the outer surface of the molded product (A2) is ground while the molded product (A2) is rotated.

10. The method according to claim 7, further comprising:
thermoforming a mixture of (b1) a granular activated carbon and (b2) a granular binder to give (B) a cylindrical filter, and
inserting the cylindrical filter (B) into a hollow space of the cylindrical filter (A).

* * * * *